(12) United States Patent
Chiba

(10) Patent No.: US 8,045,221 B2
(45) Date of Patent: Oct. 25, 2011

(54) IMAGE-PROCESSING DEVICE, IMAGE-PROCESSING METHOD, AND RECORDING MEDIUM

(75) Inventor: Toru Chiba, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 792 days.

(21) Appl. No.: 11/404,763

(22) Filed: Apr. 17, 2006

(65) Prior Publication Data
US 2007/0064249 A1    Mar. 22, 2007

(30) Foreign Application Priority Data
Sep. 16, 2005 (JP) ................................. 2005-270620

(51) Int. Cl.
H04N 1/60 (2006.01)
H04N 1/62 (2006.01)
H04N 1/54 (2006.01)
H04N 1/56 (2006.01)
G03F 3/10 (2006.01)

(52) U.S. Cl. .......... 358/1.9; 358/3.1; 358/515; 358/518; 358/519; 358/521; 358/523; 358/524; 382/162; 382/167

(58) Field of Classification Search ............ 358/1.9, 358/3.1, 515, 518, 519, 521, 523, 524; 382/162, 382/167

See application file for complete search history.

(56) References Cited

U.S. PATENT DOCUMENTS

| | | | | |
|---|---|---|---|---|
| 5,216,498 A | * | 6/1993 | Matsunawa et al. | 358/500 |
| 5,245,417 A | * | 9/1993 | Hibi et al. | 358/515 |
| 5,276,459 A | * | 1/1994 | Danzuka et al. | 346/33 A |
| 5,406,379 A | | 4/1995 | Kingsley et al. | |
| 5,493,622 A | * | 2/1996 | Tsuchino et al. | 382/132 |
| 5,606,630 A | * | 2/1997 | Maeda et al. | 382/254 |
| 5,715,330 A | * | 2/1998 | Kawasaka | 382/169 |
| 5,875,036 A | * | 2/1999 | Sasanuma | 358/3.24 |
| 5,960,122 A | * | 9/1999 | Morikawa | 382/274 |
| 6,057,946 A | * | 5/2000 | Ikeda et al. | 358/518 |
| 6,061,091 A | * | 5/2000 | Van de Poel et al. | 348/241 |
| 6,097,501 A | * | 8/2000 | Hayashi et al. | 358/1.9 |
| 6,160,912 A | * | 12/2000 | Usami | 382/167 |
| 6,160,922 A | * | 12/2000 | Hayashi | 382/274 |
| 6,631,210 B1 | * | 10/2003 | Mutoh et al. | 382/176 |
| 6,637,849 B2 | * | 10/2003 | Maltz | 347/15 |

(Continued)

FOREIGN PATENT DOCUMENTS

| JP | 6-217115 | | 8/1984 |
|---|---|---|---|
| JP | 5-130404 | | 5/1993 |
| JP | 06-113126 | * | 4/1994 |
| JP | A-2001-197309 | | 7/2001 |
| JP | 2001-322313 | * | 11/2001 |
| JP | 2004-145143 | * | 5/2004 |
| JP | A-2004-145143 | | 5/2004 |
| JP | A-2004-297667 | | 10/2004 |

Primary Examiner — Chan S Park
Assistant Examiner — Beniyam Menberu
(74) Attorney, Agent, or Firm — Morgan, Lewis & Bockius LLP

(57) ABSTRACT

An image-processing device includes: a color conversion unit that converts an input image data expressed by a combination of light's primary colors into an intermediate image data in which a color of each pixel is expressed by a combination of basic printing colors; a density correction unit that corrects the intermediate image data so that density of a pixel of the intermediate image data corresponds to that of a corresponding pixel of the input image data; an identifying unit that identifies an area in which the density is close to a prescribed value by analyzing the intermediate image data; and an output unit that corrects a density distribution in a pixel of the intermediate image data contained in the area in accordance with a prescribed distribution function and outputs the result.

11 Claims, 4 Drawing Sheets

U.S. PATENT DOCUMENTS

| | | | |
|---|---|---|---|
| 6,819,439 B2 * | 11/2004 | Hayashi et al. | 358/1.13 |
| 6,873,441 B1 * | 3/2005 | Kuwabara et al. | 358/3.26 |
| 6,970,273 B1 * | 11/2005 | Inoue | 358/3.02 |
| 7,221,480 B2 | 5/2007 | Hirayama | 358/1.9 |
| 2001/0043368 A1 * | 11/2001 | Morikawa | 358/458 |
| 2004/0070777 A1 * | 4/2004 | Nishikawa et al. | 358/1.9 |
| 2004/0104952 A1 * | 6/2004 | Tsuchiya et al. | 347/15 |
| 2004/0119995 A1 * | 6/2004 | Nishi et al. | 358/1.9 |
| 2004/0233476 A1 * | 11/2004 | Shoda | 358/2.1 |
| 2005/0053386 A1 * | 3/2005 | Takuma et al. | 399/27 |
| 2005/0088697 A1 * | 4/2005 | Yasutomi et al. | 358/2.1 |
| 2005/0280866 A1 * | 12/2005 | Ikeno | 358/2.1 |
| 2006/0017944 A1 * | 1/2006 | Nakahanada et al. | 358/1.8 |
| 2006/0061840 A1 * | 3/2006 | Kashibuchi | 358/518 |

* cited by examiner

IMAGE-PROCESSING DEVICE, IMAGE-PROCESSING METHOD, AND RECORDING MEDIUM

This application claims priority under 35 U.S.C. §119 of Japanese Patent Applications No. 2005-270620 filed on Sep. 16, 2005, the entire contents of which are incorporated hereinto by reference.

BACKGROUND

1. Technical Field

The present invention relates to a technique for converting an image having pixels whose colors are expressed based on light's three primary colors to an image having pixels whose colors are expressed based on basic printer colors.

2. Related Art

With the recent rapid increase in popularity of digital cameras, users have turned to a convenient technique referred to as "photo-printing" for obtaining output copies of their images. According to this technique, an electrophotographic image forming device such as a printer is used for recording an image on a recording medium, such as a paper.

Electrophotographic image forming devices have been generally used for outputting text images or line drawing images. However, different to such images, those taken by digital cameras contain delicately varying hues that impart a so-called "natural" quality to an image to produce a "natural image". It is known that, when an electrophotographic image forming device prints out a "natural image", pseudo or false contours (hereafter, "tone jumps") may appear, as shown in FIGS. 8A and 8B. This effect is pronounced when an image recording medium is a printing paper for photo-printing use. FIG. 8B, which is a cyan color image of the image shown in FIG. 8A, shows prominent tone jumps.

There have heretofore been proposed a number of techniques for avoiding generation of tone jumps.

SUMMARY

According to an aspect of the present invention, an image-processing device includes: an input unit that inputs image data in which a color of each pixel is expressed by a combination of light's three primary colors, red, green and blue; a color conversion unit that converts the input image data into intermediate image data in which a color of each pixel is expressed by a combination of basic printing colors, cyan, magenta, yellow, and black; a density correction unit that corrects the intermediate image data so that density of each target pixel of the intermediate image data corresponds to density of a pixel of the input image data corresponding to the target pixel; an identifying unit that identifies an area in which density is close to a prescribed value by analyzing the intermediate image data, density of which has been corrected by the density correction unit; and an output unit that corrects a density distribution in a pixel of the intermediate image data contained in the area identified by the identifying unit in accordance with a prescribed distribution function, and outputs the result.

BRIEF DESCRIPTION OF THE DRAWINGS

Exemplary embodiments of the present invention will now be described in detail with reference to the following figures, wherein.

DETAILED DESCRIPTION OF THE INVENTION

Exemplary embodiments of the present invention will hereafter be described with reference to the drawings.

(A: Structure)

Figure 1:
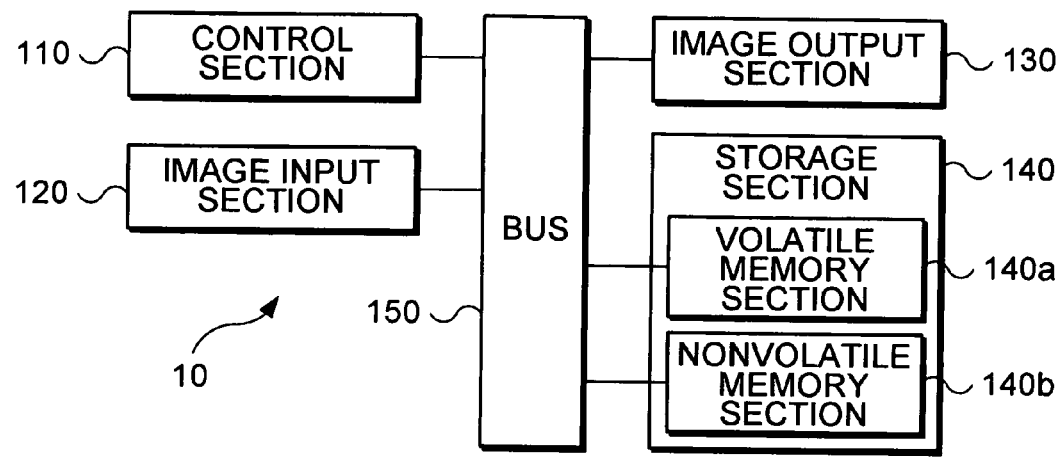
FIG. 1 is a block diagram showing the structure of an image-processing device according to the present invention.

FIG. 1 illustrates a hardware structure of an image-processing device 10 according to one exemplary embodiment of the present invention. As shown in FIG. 1, the image-processing device 10 includes a control section 110, an image input section 120, an image output section 130, a storage section 140, and a bus 150 for mediating data delivery between the aforementioned sections.

The control section 110 includes a CPU (Central Processing Unit), for example, for centrically controlling the sections of the image-processing device 10 by running a program stored in the storage section 140.

The image input section 120 includes a USB (Universal Serial Bus) interface, for example, and is connected to a scanner or digital camera (not shown). The image input section 120 receives RGB image data from the scanner or digital camera through a USB cable and delivers it to the control section 110. Here, the RGB image data is image data in which a color of each pixel is expressed based on light's three primary colors, that is, red (R), green (G), and blue (B).

The image output section 130 receives a YMCK image data from the control section 110 and outputs the image expressed by the YMCK image data by printing it with an electrophotographic process on a recording material such as a printing paper. Here, the YMCK image data is image data in which a color of each pixel is expressed based on the four basic printer colors, yellow (Y), magenta (M), cyan (C), and black (K).

The storage section 140 includes a volatile memory section 140a and a nonvolatile memory section 140b, as shown in FIG. 1.

The nonvolatile memory section 140b is, for example, a hard disk. The nonvolatile memory section 140b is preliminarily stored with a program for the control section 110 to execute an image-processing process to convert RGB image data into YMCK image data and output it, and various lookup tables (called "LUT" hereinafter) referred to when running the program. The LUT to be stored in the nonvolatile memory section 140b may be: a color conversion LUT referred to during conversion from an RGB color specification system to a YMCK color specification system; an output characteristic LUT representing output characteristics of the image output section 130; a density correcting LUT for correcting the output characteristic of the image output section 130 to bring into accordance a density (or gradation) of the input image (i.e., RGB image) with that of the output image (i.e., YMCK image). In this exemplary embodiment, density is depicted in terms of percentage. For example, n % density means that a ratio of colored pixels to the total number of pixels constituting the image is n %. That is, if the total number of the pixels is 100, n pixels among them are colored.

Figure 2A:
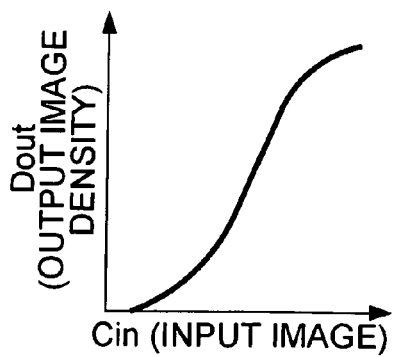
FIGS. 2A to 2C illustrate examples of a lookup table stored in a non-volatile memory section of the image-processing device.

The output characteristic LUT includes an output image density (Dout) of an image outputted from the image output section 130, which corresponds to each input image density Cin of an image inputted from the image input section 120. FIG. 2A is a graph showing an output characteristic curve obtained by plotting the output characteristic LUT by allocating Cin on the ordinate and Dout on the abscissa. As shown in FIG. 2A, the image output section 130 has an output characteristic in which density of the output image is 0% if the density of the input image is less than a certain level (hereafter, "reproduction initiation point"), and the pixels are not colored. Although the output characteristics of the actual image output section 130 differ to some extent among different image-processing devices 10, according to this exemplary embodiment, image-processing devices 10 of the same model are set to have identical output characteristics LUT, which are written in the nonvolatile memory section 140*b*.

Figure 2B:
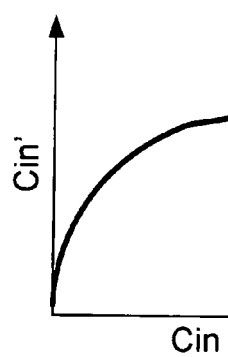
Figure 2C:
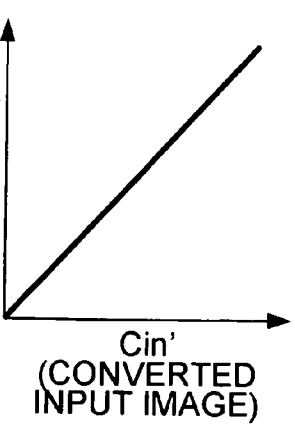

The density correcting LUT has content including a converted density Cin' for each density Cin of an inputted image, as shown in FIG. 2B. The density correcting LUT thus converts an inputted image density Cin into Cin', according to the content, so that the converted density Cin' and the output image density Dout have a linear relationship, as shown in FIG. 2C, thereby making the density of the output image correspond to that of the input image. In this embodiment, image-processing devices 10 of the same model also include a nonvolatile memory section 140*b* in which identical density correcting LUT is written.

The volatile memory section 140*a* is RAM (Random Access Memory), for example, and is used as a work area for the control section 110 to run the aforementioned program. More specifically, the RGB image data delivered from the image input section 120 is written in the volatile memory section 140*a*.

As described above, the hardware structure of the image-processing device 10 according to this exemplary embodiment is the same as that of commonly available computers, and is able to realize functions unique to the image-processing device 10 of the present invention by causing the control section 110 to run the program stored in the nonvolatile memory section 140*b*.

(B: Work Process)

Figure 8A:
FIGS. 8A and 8B are examples of an image showing generation of tone jumps.

In the following image data processing executed by the control section 110 in accordance with the aforementioned program is described with reference to FIG. 4. This exemplary embodiment addresses a case where RGB data expressing an original image shown by FIG. 8A is inputted through the image input section 120. Here, the RGB data is inputted after being subjected to pre-processing such as a color correction process and optimization process.

Figure 3:
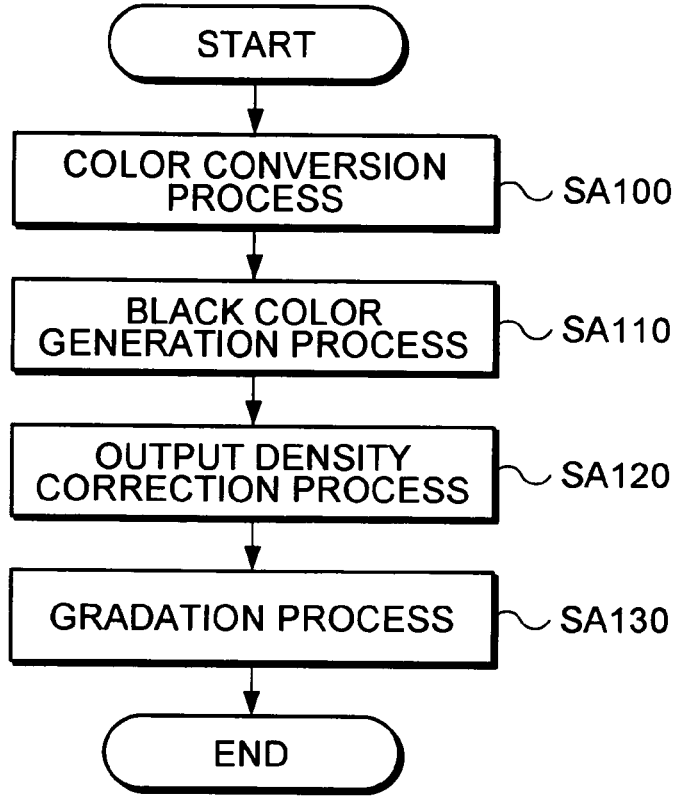
FIG. 3 is a flowchart illustrating a process executed by the control section of the image-processing device.

FIG. 3 is a flowchart of an image data processing executed by the control section 110 in accordance with the aforementioned program. When the RGB data is inputted via the image input section 120, the control section 110 stores the inputted data in the volatile memory section 140*a*, and sequentially carries out a color conversion process (step SA100), a black color generation process (step SA110), and an output density correction process (step 120) to the RGB data.

The color conversion process is a process of converting the RGB data into an image data in which each pixel is expressed by a combination of three colors, Y, M, and C, (hereafter "YMC image data") by referring to the content of the aforementioned color conversion LUT, and the black color generation process is a process to generate a YMCK image data by analyzing the YMC image data generated in step SA100, and converting the color of the pixels whose combination ratio of the three colors, Y, M, and C corresponds to the so-called composite black ratio into black color. Also, the output density correction process is a process of correcting density or gradation of each pixel of the YMCK image data generated in step SA100 by referring to the aforementioned output characteristic LUT for each color component.

The difference between the aforementioned image-processing device 10 according to the present invention and the conventional one is that, following the output density correction process in step 120, a gradation process is carried out in step SA130, as shown in FIG. 3. More specifically, in step SA130, the control section 110 carries out a gradation process to the C components of the YMCK image data, which has gone through the output density correction process in step SA120 and is hereafter called "intermediate image data", in a manner shown in FIG. 4.

Figure 4:
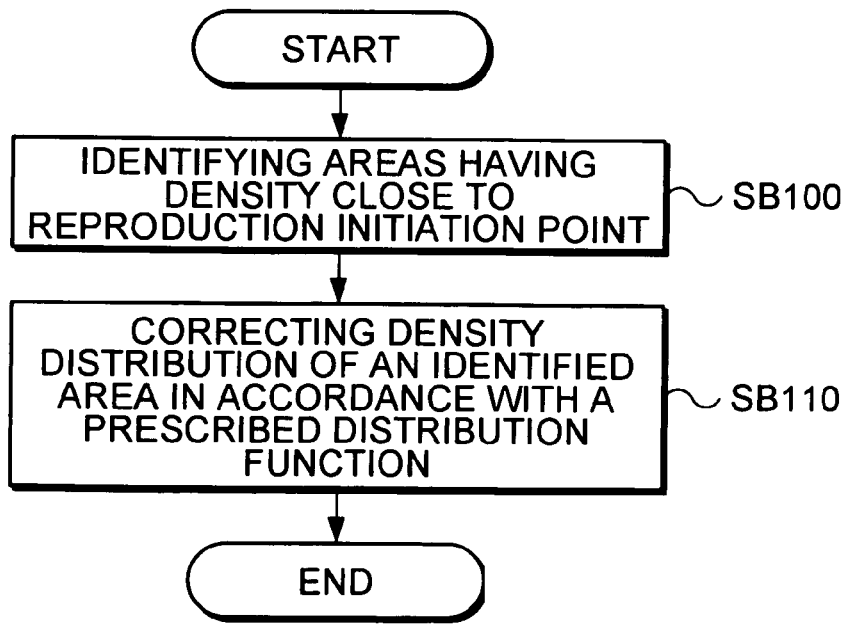
FIG. 4 is a flowchart illustrating a gradation process executed by the control section.

FIG. 4 is a flowchart of the gradation process carried out by the control section 110. As shown here, the control section 110 identifies in step SB100 areas having a density close to the aforementioned reproduction initiation point for the C components of the intermediate image data. More specifically, the control section 110 compares, for each pixel of the C components of the intermediate image data, the density of the pixel and the reproduction initiation point for the C components, and if the difference between the two is within the prescribed threshold value (4% in the exemplary embodiment, for example), it determines the area of those pixels as the area having a density close to the reproduction initiation point.

Then, the control section 110 corrects the density distribution of the area identified in step SB100 in accordance with a prescribed distribution function, which is a Gaussian distribution function having a full-width-at-half-maximum of 10 pixels, in the exemplary embodiment, in step SB110. More specifically, the control section 110 carries out the following process to the pixels in the identified area in units of a raster direction, that is, line by line. First, the control section 110 aligns the peak of the Gaussian distribution function with a location of a pixel having a maximum density in the raster direction within the area, and arbitrarily adjusts the function's parameters to conform to the peak value of the Gaussian distribution function to the density of the peak pixel. Then, the control section 110 picks up a pixel neighboring the peak pixel as a first target pixel, and then picks up a second target pixel neighboring the first target pixel, and so on. And the control section 110 sequentially compares the density of each target pixel with the Gaussian distribution function at a position of the target pixel, which is obtained by inputting a distance (number of pixels) of the target pixel from the peak position into the Gaussian distribution function, and, if the latter exceeds the former, the control section 110 replaces the target pixel's density with the function's value.

Then, the control section 110 delivers the YMCK image data generated by the aforementioned gradation process to the image output section 130 to make it form an image corresponding to the YMCK image data on a recording material.

The reason for carrying out the gradation process to C components of the intermediate image data (that is, YMCK image data finished with the output density correcting process) in the image-processing process executed by the control section 110 is as follows.

Although the contents of the output characteristic LUT and density correction LUT are set to be identical for the same model of the image-processing device 10, as described above, actual output characteristic of the image output section 130 generally varies depending on the respective devices. Also, if the actual output characteristic of the image output section 130, which is shown by a broken line in FIG. 5A, is shifted lower than the prescribed output characteristic of the output characteristic LUT, which is shown by a solid line in FIG. 5A, that is, the actual reproduction initiation point is lower than that of the output characteristic LUT, densities after the output density correction will shift to being high overall, as shown in FIG. 5B.

Figure 5A:
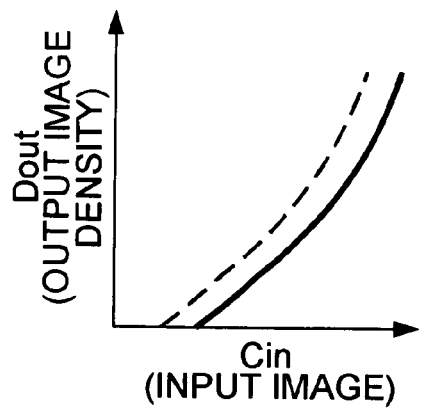
FIGS. 5A and 5B are graphs showing dispersion of output characteristics of an image output section.
Figure 5B:
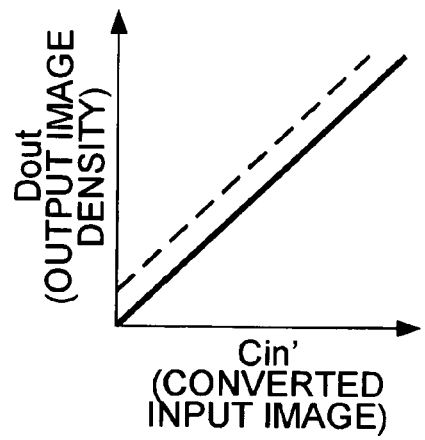
Figure 8B:

Therefore, in the intermediate image data obtained by the image-processing device 10 that is provided with an image output section 130 having an output characteristic shown in FIG. 5A, a density jump may occur at low density locations (such as the highlighted area). This is because, while pixels having a 0% density before the output density correction are outputted with 0% density after the output density correction, pixels having a density close to the reproduction initiation point before the output density correction are outputted with a higher density than that corrected by referring to the output characteristic LUT or density correction LUT stored in the nonvolatile memory section 140b. The density jump causes the tone jump shown in FIG. 8B. If the actual output characteristic is shifted to the higher density side, the corrected density will be shifted to a lower density side, and density jumps as well as tone jumps will not be generated.

As described above, whether tone jumps occur or not largely depends on the output characteristic of the image output section 130 of the individual image-processing device 10. The image-processing device 10 according to this exemplary embodiment reduces the difference between the density of the highlighted area and the density of the area close to the reproduction initiation point by carrying out the aforementioned gradation process, as shown in FIG. 4, to the C components of the intermediate image data that is finished with the output density correction to thereby avoid tone jumps, which are caused by such a density difference. The reason for carrying out the gradation process only to the C components is that, in the human portrait photos shown in FIG. 8A, C component density is overall low, and density jumps are likely to occur in the area close to the reproduction initiation point.

Figure 6:
FIG. 6 is an example of an image outputted from the image output section.

FIG. 6 shows an example of an image (a cyan color image) outputted from the image-processing device 10 when the RGB image data expressing the original image shown in the FIG. 8A is inputted. As can be clearly seen by comparing the image with that shown in FIG. 8B, tone jump generation is reduced.

Figure 7A:
FIGS. 7A to 7C are, respectively, examples of an image outputted from the image output section.

FIG. 7A shows an output image that is photo-printed by an image-processing device 10, which is likely to generate tone jumps, that is, having an output characteristic in which reproduction initiation points are shifted to a lower side, after carrying out the gradation process to the original image shown in FIG. 8A. In the image of FIG. 7A, it is seen that tone jump generation is reduced to almost an invisible level, when compared to the image of FIG. 8A.

Figure 7B:
Figure 7C:

FIG. 7B shows an output image that is photo-printed by an image-processing device 10, which is unlikely to generate tone jumps, that is, having an output characteristic in which reproduction initiation points are shifted to a higher side, and FIG. 7C shows an image that is photo-printed by the same image-processing device 10 after carrying out the gradation process. As can be clearly seen by comparing both figures, it does not make much difference in the image quality by making the image-processing device 10 carry out the gradation process if the image-processing device 10 is unlikely to generate tone jumps.

As described above, the image-processing device 10 according to this exemplary embodiment is advantageous in that the gradation process is carried out to the pixels in the image to be processed and belonging to a density area close to the reproduction initiation point so as to smoothen density variation to thereby prevent generation of tone jumps.

Additionally, according to the image-processing device 10 according to this exemplary embodiment, it is not necessary to carry out a complicated process such as analyzing features of the image in order to abstract target areas for the aforementioned gradation process, and it is only necessary to judge whether the pixel density is close to the reproduction initiation point, to thereby prevent an excessive process load from being imposed on the image-processing device 10.

Also, according to the image-processing device 10 of the present invention, it is not necessary to carry out a pre-processing such as printing of the reference pattern or the like, to thereby make it easy to prevent generation of tone jumps.

(C: Modified Exemplary Embodiment)

Although the foregoing explanation of an exemplary embodiment of the present invention has been made, it is permissible to modify the exemplary embodiment as described hereafter.

(1) While the aforementioned exemplary embodiment handles a case where the RGB image data is preliminarily finished with a color correction process or optimization process before it is inputted to the image input section 120, these processes can be carried out after it is inputted and prior to the color conversion process in step SA100 by the control section 110 by rewriting the program.

(2) While the aforementioned exemplary embodiment handles a case where the image input section 120 is constructed by a USB interface, it can be constructed by an NIC (Network Interface Card) when the RGB image data source such as a scanner or digital camera is connected to the image input section 120 through a communication network such as LAN (Local Area Network). Also, when a recording medium such as an IC card is used as the RGB image data source, the image input section 120 can be constructed by a recording medium reader such as an IC card reader. The image input section 120 can be constructed by a scanner that reads out an image from a recording material such as a printing paper and generates an RGB image data corresponding to the read-out image to send it to the control section 110.

(3) While the aforementioned exemplary embodiment handles a case where the image output section 130 forms images through an electrophotographic image forming process, it can use another process such as an ink-jet process. While the aforementioned exemplary embodiment handles a case where the image-processing device 10 per se caries out the image forming process, the process can be carried out by an exterior output device such as a printer connected through a communication line such as LAN. This is carried out by sending the YMCK image data that is generated by the control section 110 by running the program to the exterior output device so as to form an image corresponding to the YMCK image data on a recording material. In this case, the image output section 130 can be constructed by an NIC (Network Interface Card). If the YMCK image data is outputted by being written to a recording medium such as an IC card, the image output section 130 can be constructed by a recording medium writing device such as an IC card writer.

(4) While the aforementioned exemplary embodiment handles a case where the area close to the reproduction initiation point is defined as an area where the pixels have a density different from that of the reproduction initiation point by less than the threshold value of 4%, this threshold value is not limited to 4% and can be arbitrarily determined by evaluating the effect of the gradation process.

Also, while the aforementioned exemplary embodiment handles a case where the density distribution within the area having a density close to the reproduction initiation point is corrected by using a Gaussian distribution function having a full-width-at-half-maximum of 10 pixels, the full-width-at-half-maximum of the Gaussian distribution function is not limited to 10 pixels and can be arbitrarily determined by evaluating the effect of the gradation process.

Also, while the aforementioned exemplary embodiment handles a case where the density distribution within the area having a density close to the reproduction initiation point is corrected by using a Gaussian distribution function, a Lorentz distribution function can be used instead. It is desirable to use a distribution function having a single peak and progressively approaching 0 as departing from the peak position, and being symmetrical at the peak position, because, in a natural image, density or gradation change continuously, and the density value or gradation value is a positive value.

(5) In the aforementioned exemplary embodiment, the gradation process is carried out only to the C component of the intermediate image data during the output gradation correction process. However, the gradation process may be carried out to other components, and it is possible to make the image-processing device 10 select the target component depending on the characteristic of the image to be processed. For example, if the image-processing device 10 handles an image with an overall low density of M components, the M component is selected as the target of the gradation process.

(6) While the aforementioned exemplary embodiment handles a case where the gradation process is carried out to a prescribed target component (C component in the exemplary embodiment), regardless of the type of the target image, that is, whether the image to be processed is a natural image or an image constructed with line drawings and colorings (hereafter "animation image"), it is possible to carry out the gradation process only when the target image is a natural image. More specifically, a user is urged to operate an operating portion provided in the image-processing device 10, not shown in the drawings, to indicate the type of the target image to the image-processing device 10, and the image-processing device 10 carries out the gradation process only when it receives an instruction that the target image is a natural image. Since the images taken by a digital camera or the like usually have a specific image size such as a customized photo-print size, it is possible to carry out the gradation process if the target image has such a specific image size. In this case, animation images having a specific size may happen to be subjected to the gradation process, which, however, does not affect the quality of the animation images.

(7) In the aforementioned exemplary embodiment, a program that makes the control section 110 execute the image-processing process unique to the present invention is stored in the nonvolatile memory section 140b of the image-processing device 10 in advance. However, it is possible to provide a recording medium such as a CD-ROM or a DVD-ROM on which the program is written, so that a commonly available computer can run the program by installing it via the recording medium. Thus, the common computers can be provided with an identical function to the image-processing device 10 according to the present invention.

While the aforementioned exemplary embodiment handles a case where functions specific to the image-processing device 10 according to the present invention are realized by using software modules, it is possible to realize such functions by using hardware modules.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described to best explain the principles of the invention and its practical applications, to thereby enable others skilled in the art to understand various embodiments of the invention and various modifications thereof, to suit a particular contemplated use. It is intended that the scope of the invention be defined by the following claims and their equivalents.

What is claimed is:

1. An image-processing device comprising:
an input unit that inputs image data in which a color of each pixel is expressed by a combination of light's three primary colors, red, green and blue;
a color conversion unit that converts the input image data into intermediate image data in which a color of each pixel is expressed by a combination of basic printing colors, cyan, magenta, yellow, and black;
a density correction unit that corrects the intermediate image data so that density of each target pixel of the intermediate image data corresponds to density of a pixel of the input image data corresponding to the target pixel;
an identifying unit that identifies an area in which density is close to a prescribed value by analyzing the intermediate image data, density of which has been corrected by the density correction unit; and
an output unit that corrects a density distribution in a pixel of the intermediate image data contained in the area identified by the identifying unit in accordance with a prescribed distribution function thereby reducing tone jumps, and outputs the result,
wherein the identifying unit identifies an area in which density deviation from a reproduction initiation point, which is defined as a minimum density for which a color is reproduced by a combination of the basic printing colors, is equal to or less than a prescribed threshold value;
wherein the identifying unit (a) compares, for each pixel of the intermediate image data, density of which has been corrected by the density correction unit, density of a color of the basis printing colors, which is expressed by the pixel, and a reproduction initiation point, which is defined as a minimum density for which the color is reproduced, and (b) identifies an area of pixels in which a difference between the density of the color and the reproduction initiation point is equal to or less than the prescribed threshold value; and
wherein the output unit (a) identifies a pixel having a maximum density of the color from among pixels of the intermediate image data contained in the area identified by the identifying unit, (b) adjusts parameters of the prescribed distribution function so that a peak value of the prescribed distribution function conforms to the density of the identified pixel, (c) calculates, for a pixel adjacent to the identified pixel, a value of the prescribed distribution function on the basis of a distance between the adjacent pixel and the identified pixel, (d) compares the calculated value of the prescribed distribution function and density of the color, which is expressed by the adjacent pixel, and (e) if the value of the prescribed distribution function exceeds the density of the color, which is expressed by the adjacent pixel, replaces the density of the color, which is expressed by the adjacent pixel, with the value of the prescribed distribution function.

2. The image-processing device according to claim 1, wherein the identifying unit identifies the area with regard to a prescribed color from among the basic printing colors.

3. The image-processing device according to claim 1, wherein the density correction unit corrects the intermediate image data by referring to a lookup table showing a relationship between a density of a color expressed by the light's three primary colors and density of a color expressed by the basic printing colors so that density of each target pixel of the intermediate image data corresponds to the density of a pixel of the input image data corresponding to the target pixel.

4. The image-processing device according to claim 1, wherein the prescribed threshold value is approximately 4%.

5. The image-processing device according to claim 1, wherein the distribution function in the output unit has a single peak, progressively approaches 0 as departing from the peak position, and is symmetrical at the peak position.

6. The image-processing device according to claim 1, further comprising an operation unit that receives instructions from a user,
wherein the identifying unit identifies an area in which density of the intermediate image data is close to a prescribed value and the output unit carries out a density correction process in accordance with a prescribed distribution function when the operation unit receives an instruction that the target image is a natural image.

7. The image-processing device according to claim 1, wherein the input image data comprises an image size of a target image to be processed, the identifying unit identifies an area in which the density of the intermediate image data is close to a prescribed value, and the output unit carries out a density correction process in accordance with a prescribed distribution function when the image size is a prescribed value.

8. An image-processing method comprising:
receiving an input image data in which a color of each pixel is expressed by a combination of light's three primary colors, red, green and blue from an input unit;
converting the input image data into an intermediate image data in which a color of each pixel is expressed by a combination of basic printing colors, cyan, magenta, yellow, and black;
correcting the intermediate image data so that density of each target pixel of the intermediate image data corresponds to the density of a pixel of the input image data corresponding to the target pixel in a density correction unit;
identifying an area in which density is close to a prescribed value by analyzing the intermediate image data of which density has been corrected by the density correction unit in an identifying unit; and
correcting a density distribution in a pixel of the intermediate image data contained in the area identified by the identifying unit in accordance with a prescribed distribution function thereby reducing tone jumps,
wherein the identifying unit identifies an area in which density deviation from a reproduction initiation point, which is defined as a minimum density for which a color is reproduced by a combination of the basic printing colors, is equal to or less than a prescribed threshold value;
wherein the identifying unit (a) compares, for each pixel of the intermediate image data, density of which has been corrected by the density correction unit, density of a color of the basis printing colors, which is expressed by the pixel, and a reproduction initiation point, which is defined as a minimum density for which the color is reproduced, and (b) identifies an area of pixels in which a difference between the density of the color and the reproduction initiation point is equal to or less than the prescribed threshold value; and
wherein the step of correcting a density distribution in a pixel of the intermediate image data comprises:
(a) identifying a pixel having a maximum density of the color from among pixels of the intermediate image data contained in the area identified by the identifying unit;
(b) adjusting parameters of the prescribed distribution function so that a peak value of the prescribed distribution function conforms to the density of the identified pixel;
(c) calculating, for a pixel adjacent to the identified pixel, a value of the prescribed distribution function on the basis of a distance between the adjacent pixel and the identified pixel;
(d) comparing the calculated value of the prescribed distribution function and density of the color, which is expressed by the adjacent pixel; and
(e) if the value of the prescribed distribution function exceeds the density of the color, which is expressed by the adjacent pixel, replacing the density of the color, which is expressed by the adjacent pixel, with the value of the prescribed distribution function.

9. A non-transitory recording medium readable by a computer storing a program for running a process comprising:
receiving an input image data in which a color of each pixel is expressed by a combination of light's three primary colors, red, green and blue;
converting the input image data into an intermediate image data in which a color of each pixel is expressed by a combination of basic printing colors, cyan, magenta, yellow, and black;
correcting the intermediate image data so that density of each target pixel of the intermediate image data corresponds to the density of a pixel of the input image data corresponding to the target pixel;
identifying an area in which density is close to a prescribed value by analyzing the intermediate image data of which density has been corrected in an identifying unit; and
correcting a density distribution in a pixel of the intermediate image data contained in the identified area in correspondence with a prescribed distribution function thereby reducing tone jumps,
wherein the identifying unit identifies an area in which density deviation from a reproduction initiation point, which is defined as a minimum density for which a color is reproduced by a combination of the basic printing colors, is equal to or less than a prescribed threshold value;
wherein the identifying unit (a) compares, for each pixel of the intermediate image data, density of which has been corrected, density of a color of the basis printing colors, which is expressed by the pixel, and a reproduction initiation point, which is defined as a minimum density for which the color is reproduced, and (b) identifies an area of pixels in which a difference between the density of the color and the reproduction initiation point is equal to or less than the prescribed threshold value; and
wherein the step of correcting a density distribution in a pixel of the intermediate image data comprises:

(a) identifying a pixel having a maximum density of the color from among pixels of the intermediate image data contained in the area identified by the identifying unit;

(b) adjusting parameters of the prescribed distribution function so that a peak value of the prescribed distribution function conforms to the density of the identified pixel;

(c) calculating, for a pixel adjacent to the identified pixel, a value of the prescribed distribution function on the basis of a distance between the adjacent pixel and the identified pixel;

(d) comparing the calculated value of the prescribed distribution function and density of the color, which is expressed by the adjacent pixel; and (e) if the value of the prescribed distribution function exceeds the density of the color, which is expressed by the adjacent pixel, replacing the density of the color, which is expressed by the adjacent pixel, with the value of the prescribed distribution function.

10. An image-processing device comprising:

an input unit that inputs image data in which a color of each pixel is expressed by a combination of light's three primary colors, red, green and blue;

a color conversion unit that converts the input image data into intermediate image data in which a color of each pixel is expressed by a combination of basic printing colors;

a density correction unit that corrects the intermediate image data so that density of each target pixel of the intermediate image data corresponds to density of a pixel of the input image data corresponding to the target pixel;

an identifying unit that identifies an area in which density is close to a prescribed value by analyzing the intermediate image data, density of which has been corrected by the density correction unit; and an output unit that corrects a density distribution in a pixel of the intermediate image data contained in the area identified by the identifying unit in accordance with a prescribed distribution function thereby reducing tone jumps, and outputs the result, wherein the identifying unit identifies an area in which density deviation from a reproduction initiation point, which is defined as a maximum input density level resulting in 0% output density, is equal to or less than a prescribed threshold value;

wherein the identifying unit (a) compares, for each pixel of the intermediate image data, density of which has been corrected by the density correction unit, density of a color of the basis printing colors, which is expressed by the pixel, and a reproduction initiation point, which is defined as a minimum density for which the color is reproduced, and (b) identifies an area of pixels in which a difference between the density of the color and the reproduction initiation point is equal to or less than the prescribed threshold value; and wherein the output unit (a) identifies a pixel having a maximum density of the color from among pixels of the intermediate image data contained in the area identified by the identifying unit, (b) adjusts parameters of the prescribed distribution function so that a peak value of the prescribed distribution function conforms to the density of the identified pixel, (c) calculates, for a pixel adjacent to the identified pixel, a value of the prescribed distribution function on the basis of a distance between the adjacent pixel and the identified pixel, (d) compares the calculated value of the prescribed distribution function and density of the color, which is expressed by the adjacent pixel, and (e) if the value of the prescribed distribution function exceeds the density of the color, which is expressed by the adjacent pixel, replaces the density of the color, which is expressed by tile adjacent pixel, with the value of the prescribed distribution function.

11. The image-processing device according to claim 1, wherein the identifying unit identifies the area in which density is close to a prescribed value only to components with cyan color.

* * * * *